United States Patent Office 3,515,742
Patented June 2, 1970

3,515,742
ADIABATIC PROCESS FOR PREPARING AMINO-NITRILES USING HEAT RECYCLE
Charles R. Morgan, Laurel, and John J. Godfrey, Silver Spring, Md., assignors to W. R. Grace & Co., New York, N.Y., a corporation of Connecticut
No Drawing. Filed May 8, 1967, Ser. No. 636,662
Int. Cl. C07c *121/42, 121/52*
U.S. Cl. 260—465.5
7 Claims

ABSTRACT OF THE DISCLOSURE

Aminonitriles are prepared by reacting an amine, hydrogen cyanide and formaldehyde in an acid reaction media under substantially adiabatic reaction conditions. The heat liberated during the reaction is subsequently removed from the reacted reaction mixture and transferred to the incoming reactants.

---

The present invention relates to the production of aminonitriles, and more specifically to an improved, more rapid and economical method for preparing aminonitriles by the adiabatic reaction of an amine, formaldehyde, and hydrogen cyanide.

It is known that an amine will react with formaldehyde and hydrogen cyanide in the presence of an aqueous acid reaction media to produce aminonitrile. In the course of such a reaction wherein the amine is ammonia, nitrilotriacetonitrile (NTAN) is produced in accordance with the following general equation:

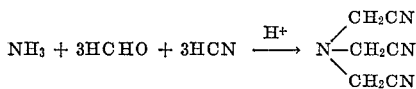

When the above reaction is carried out under adiabatic conditions in a sealed reactor using typical combinations of reactants autogenous pressures on the order of only about one atmosphere are ultimately produced along with a temperature rise on the order of about 50–100° C. During the course of this reaction considerable heat is evolved however, which is generally dissipated and lost during the recovery of the reaction products. The loss of this heat represents an economical loss of substantial magnitude when such a procedure is conducted on a large commercial scale.

It is therefore an object of the present invention to provide an improved method for preparing aminonitriles by the adiabatic reaction of an amine, formaldehyde and hydrogen cyanide in aqueous acid media.

It is a further object to provide a more rapid, preferably continuous, method for producing aminonitriles which provides a means for utilizing heat normally wasted during the course of an adiabatic aminonitrile synthesis.

These and still further objects of the present invention will become readily apparent to one skilled in the art from the following detailed description and specific examples.

Broadly, the present invention involves an improved adiabatic method for producing aminonitriles wherein heat liberated during the exothermic reaction of an amine, formaldehyde and hydrogen cyanide is conserved and recycled to the reaction procedure.

More specifically, our present invention contemplates a method which involves:

(1) Reacting an initial reaction mixture which comprises an amine, formaldehyde, and hydrogen cyanide in aqueous acid media under substantially adiabatic and autogenous pressure conditions to form aminonitrile, (2) Recovering a substantial amount of heat generated during the reaction from the ultimate reaction products by heat transfer means, and (3) Recycling said recovered heat to fresh incoming initial reaction mixture to increase the temperature thereof as it enters the adiabatic reaction.

We have found that using the above heat recycled technique the total reaction time required to produce aminonitrile in practically quantitative yields is substantially reduced without requiring the addition of external heat to the reaction procedure. In other words, we have found that if the temperature of the initial reactants entering the reaction zone is raised to a temperature of from about 40 to about 130° C. the time required for the reactants to reach the completion is substantially reduced. We have found that the heat used to raise the temperature of the initial reactants may be conveniently obtained by extracting the heat of reaction contained in the final reaction mixture by heat exchange means, and transferring said heat to the initial reactants. Preferably the heat is exchanged from the reactants at a temperature of from about 90 to about 130° C. to prevent undue precipitation or discoloration of aminonitrile. It is seen by using this technique, the initial temperature of the reactants may be increased, and the total reaction time substantially decreased without the use of heat from any external source.

By using the present heat recycle technique in combination with a continuous reaction method the overall reaction procedure may be generally described as being conducted under substantially adiabatic reaction conditions. Obviously, due to the fact that no heat transfer system is 100% efficient, small losses of heat invariably result during the overall heat transfer operation. However, the ultimate aim of the present procedure is to restrict any heat loss to the minimum, and thereby preserve the theoretical adiabatic condition which is contemplated.

The present procedure is presently carried out in a continuous manner wherein the initial reactants either individually or in combination are maintained in heat transfer contact with the heat containing reaction products until a temperature on the order of from about 40 to about 130° C. is achieved. This heated initial reaction mixture is then conducted through an insulated reaction zone which is normally in the form of elongated tube. During the passage through the insulated tube an exothermic reaction occurs wherein the reactants attain an ultimate temperature on the order of from about 90 to about 200° C. The actual temperature increase which occurs during the course of the reaction is largely dependent upon the heat capacity of the reaction mixture utilized. For example, should a relatively dilute reaction mixture be used which contains about 75% by weight of water, the temperature rise observed will be around 50° C. On the other hand, should the water content be reduced to about 25% by weight of the mixture, the heat rise may approach 100° C. The final reaction mixture is then either conducted in heat transfer contact with fresh incoming reactants, or the heat therefrom is transferred by an intermediate heat transfer mechanism which then is used to conduct the heat of reaction to the initial reactants. The apparatus used to conduct the present operation may be constructed of either stainless steel or conventional glass lined equipment and should be of sufficient strength and quality to withstand the autogenous pressure of from about 1 to 3 atmospheres encountered during the course of the reaction.

The amines used in the presently contemplated synthesis have been heretofore generally defined in the following U.S. patents to J. J. Singer et al.: 2,855,428, 3,061,628.

Typical amines having replaceable hydrogens in the present synthesis may be generally represented by formulae such as follows:

(I) 

(II) 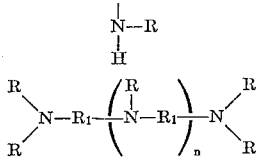

In the above Formulae I and II R may represent hydrogen, alkyl, phenyl, alkylphenyl, phenylalkyl, hydroxyalkyl or cycloalkyl. $R_1$ may represent alkylene or phenylene. In Equation II above, $n$ may have a value of from about 0 to 20.

In addition to amines having replaceable hydrogen atoms, tertiary amines such as hexamethylenetetramine (HMTA) and other tertiary amines arising from the condensation of amines with formaldehyde may also be utilized.

Typical products derived from tertiary amines may be represented by the following general formula:

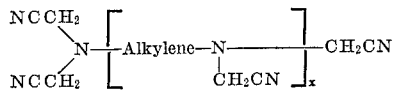

wherein up to 2 of the positions occupied by —$CH_2CN$ groups may be occupied by —$CH_2OH$ and/or $$CH_2CH_2OH$$

groups, $x$ is an integer including 0 having a value of up to about 4, and alkylene is lower alkylene having from about 1 to 4 carbon atoms.

Specific examples of amines used in our invention are ammonia, ethylenediamine, diethylenetriamine, triethylenetetramine, propylenediamine, dipropylenetriamine, tripropylenetetramine, benzylamine, trans - 1,2 - cyclohexanediamine, trans - 1,2 - cyclopentenediamine, hydroxyethylenediamine, N - dihydroxyethylene ethylenediamine, aniline, toluidene, N-hydroxyaniline, hexamethylenetetramine, and methyleneaminoacetonitrile.

The formaldehyde utilized in the practice of our invention may be commercially available 37% aqueous solution of formaldehyde, or the formaldehyde may be partially or entirely derived from other sources such as paraformaldehyde or hexamethylenetetramine or any other suitable condensation products of amine and formaldehyde.

The HCN reactant may be obtained from any suitable commercial source and is normally introduced into the reaction system as a liquified gas or aqueous solution thereof.

The acidic catalyst is to promote nitrile formation in the present synthesis may be an aqueous solution of mineral or organic acid. Alternatively, the reaction mixture may comprise acidic ion exchange resin or a combination of acidic ion exchange resin with a mineral or organic acid. Typical mineral and organic acids which may be used as catalysts include sulfuric acid, hydrochloric acid, nitric acid, acetic acid, and paratoluene sulfonic acid.

When an acidic ion exchange resin is used as the catalyst both synthetic organic and numerous naturally occurring and manmade inorganic cation exchange resins are suitable. Typical examples of organic synthetic ion exchange resins are the weakly acidic carboxylic cation exchange resins such as polymethacrylic resin and the more strongly acidic sulfonated polystyrene type of cation exchange resins well known to those skilled in the art. Inorganic ion exchange resins which may be used in their acid form are alumina, silica-alumina, silica-magnesia, silica-zirconia, titania, zeolite (particularly in the H+ or $NH_4^+$ form), bentonites, kaoline, montmorillonite, phosgenite, and vermiculite.

In conducting the present reaction process, it is generally preferred that the formaldehyde and HCN reactants both be present in the approximately stoichiometric amounts required to react with the amine reactant and yield the desired aminoacetonitrile. However, an excess of formaldehyde and HCN may be conveniently used and will generally tend to conserve the more expensive amine reactant. Generally speaking, it is found that when both the formaldehyde and HCN components are used in excess of up to 20% mole excess of that required to react with the amine, satisfactory results will occur. To some extent the maximum pressure achieved during the reaction depends upon the amount of excess HCN present. With 10% excess HCN a pressure of about 2 atmosphere is observed at 100° C. When the excess HCN is increased to 20%, a maximum pressure on the order of about 3 to 4 atmospheres will usually result at 100° C.

The reaction contemplated herein occurs in the presence of an acid aqueous acidic reaction medium. As indicated above, the reaction catalyst may be either a water soluble, organic or inorganic acid, or the required acidic media may be provided by the presence of an aqueous slurry of an acid type ion exchange resin or by a combination ion exchange resin and organic or inorganic acid. When a soluble acid is used to catalyze the present reaction an acid concentration of from about 0.001 to about 1 equivalents of acid per mole of amine nitrogen to be reacted is found to yield satisfactory results. In the case where a solid ion exchange resin is utilized the use of an amount of resin which yields from about 0.1 to about 4 equivalents of acid substituent per mole of nitrogen present in the reaction mixture is found to yield the desired result.

The acid ion exchange resin can be used either as an aqueous slurry which is suspended in the solution of reactants throughout the course of the reaction, or alternatively, the solid ion exchange resin may be maintained as a fixed bed within the reaction zone maintained at the required reaction temperature.

Having described the basic aspects of the present invention the following examples are given to illustrate embodiments thereof.

EXAMPLES

A reaction device was constructed as follows:

A coiled stainless steel reaction tube having a length of about 200 cm. and an inside diameter of 6 mm. was placed within a heat exchange bath. The reaction coil and bath were then placed within an insulated chamber through which inlet and outlet tubes from both ends of the reaction coil were placed. The inlet and outlet tubes were passed through individual external heat exchange baths located outside the insulated chamber. These external baths were interconnected by way of an adjustable heat exchange fluid circulation means.

A series of five 250 lb. reaction mixtures were prepared from a mixture comprising the following:

| | Pounds |
|---|---|
| $H_2O$ | 250 |
| $H_2SO_4$ (96%) | 99 |
| HCHO (37% in $H_2O$) | 362 |
| HCN | 272 |
| HMTA (30% in $H_2O$) | 328 |

Using the above reaction mixture samples, the following series of runs was conducted using a veriety of reaction (residence) times and initial reaction temperature. The various initial reaction temperatures were provided by adjusting the amount of circulation between the two external heat exchange baths which encompassed the outlet and inlet tubes.

TABLE

| Run No. | Initial temp., °C. | Final temp., °C. | Residence time (min.) | Yield NTAN (percent) |
|---|---|---|---|---|
| 1 | 13 | 100 | 32.5 | 94 |
| 2 | 30 | 115 | 9.2 | 93 |
| 3 | 40 | 125 | 6.5 | 94 |
| 4 | 60 | 145 | 5.0 | 93 |
| 5 | 72 | 157 | 2.5 | 94 |

It is seen from the above data that if heat is recycled from the final reaction products to raise the temperature of the initial reactants from 15° up to 30° C., the reaction period may be decreased from 32.5 down to 9.2 minutes. Furthermore, the reaction period may be decreased to as low as about 2.5 minutes by using heat recycle sufficient to increase the temperature of the reactants to about 72° C.

The above examples clearly illustrate that using the heat recycle technique described herein substantial yields of aminonitriles may be obtained in a minimum amount of time without the addition of external heat.

We claim:

1. In a process for preparing an aminonitrile by the exothermic reaction of reactants consisting of (i) ammonia, or an amine selected from the group consisting of hexamethylenetetramine, ethylenediamine, diethylenetriamine, triethylenetetramine, propylenediamine, dipropylenetriamine, tripropylenetetramine, benzylamine, trans-1,2-cyclohexanediamine, trans-1,2-cyclopentenediamine, hydroxyethylenediamine, N-dihydroxyethylene, ethylenediamine, aniline, toluidine, N-hydroxyaniline, and methyleneaminoacetonitrile; (ii) formaldehyde; and (iii) hydrogen cyanide, the reactants being present in quantities varying from stoichiometric to an excess of up to about 20 mole percent of hydrogen cyanide and up to about 20 mole percent of formaldehyde based on the ammonia or amine, in an aqueous reaction medium in the presence of an acid catalyst, in a reaction zone under autogenous pressure, the improvement comprising:

(a) conducting the process under substantially adiabatic conditions in a continuous manner wherein the reactants are maintained in heat transfer contact with a later recited heat-containing reaction product until the reactants attain a temperature of about 40–130° C.;

(b) conducting the thus heated reactants through an insulated reaction zone, wherein said reactants react to form a heat-containing aminonitrile reaction product having a temperature of about 90–200° C.; and (c) placing said heat-containing reaction product in heat transfer contact with said reactants to heat said reactants.

2. The process of claim 1 in which the reaction zone is constructed of stainless steel.

3. The process of claim 1 in which the reaction zone is glass lined.

4. The process of claim 1 in which the reactants are:
(a) ammonia or hexamethylenetetramine;
(b) formaldehyde; and
(c) hydrogen cyanide.

5. The method of claim 1 wherein said amine, formaldehyde and hydrogen cyanide reactants are combined in a ratio of 1 to 3 to 3 up to 1 to 3.6 to 3.6.

6. The method of claim 1 wherein a substantial portion of the amine and formaldehyde reactant is provided in the form of hexamethylenetetramine.

7. The method of claim 1 wherein said acid catalyst is sulfuric acid present in amounts varying from about 1.5 to about 20% by weight of said reaction mixture.

References Cited

UNITED STATES PATENTS

| 2,855,428 | 10/1958 | Singer et al. | 260—465.5 |
| 3,061,628 | 10/1962 | Singer et al. | 260—465.5 |
| 3,337,607 | 8/1967 | Wollensak | 260—465.5 |

JOSEPH P. BRUST, Primary Examiner

U.S. Cl. X.R.

260—464, 465